United States Patent [19]
Brew et al.

[11] Patent Number: 5,997,720
[45] Date of Patent: Dec. 7, 1999

[54] METHOD FOR MACHINING EXTRUSION DIES

[75] Inventors: Thomas W. Brew; W. Neil Peters, both of Corning, N.Y.

[73] Assignee: Corning Incorporated, Corning, N.Y.

[21] Appl. No.: 09/003,675

[22] Filed: Jan. 7, 1998

Related U.S. Application Data

[60] Provisional application No. 60/037,396, Feb. 6, 1997.

[51] Int. Cl.$^6$ ............................. B23H 9/14; B29C 41/00; A01J 21/00

[52] U.S. Cl. .................... 205/646; 205/665; 264/177.12; 425/463

[58] Field of Search ..................................... 205/646, 665; 264/177.12; 425/463

[56] References Cited

U.S. PATENT DOCUMENTS

| | | |
|---|---|---|
| 3,790,654 | 2/1974 | Bagley . |
| 3,793,169 | 2/1974 | Joslin . |
| 3,885,977 | 5/1975 | Lachman et al. . |
| 3,905,743 | 9/1975 | Bagley . |
| 4,687,563 | 8/1987 | Hayes . |
| 4,883,420 | 11/1989 | Ozaki et al. ........................ 264/177.12 |
| 4,992,233 | 2/1991 | Swaroop et al. . |
| 5,011,529 | 4/1991 | Hogue et al. . |
| 5,070,588 | 12/1991 | Miwa et al. .............................. 29/407 |
| 5,320,721 | 6/1994 | Peters . |
| 5,322,599 | 6/1994 | Peters . |
| 5,507,925 | 4/1996 | Brew . |
| 5,728,286 | 3/1998 | Suzuki et al. ........................ 205/646 X |

FOREIGN PATENT DOCUMENTS

| | | |
|---|---|---|
| 0 245 545 | 11/1987 | European Pat. Off. . |
| 0 389 253 | 9/1990 | European Pat. Off. . |

*Primary Examiner*—Donald R. Valentine
*Attorney, Agent, or Firm*—Kees van der Sterre

[57] ABSTRACT

In a metal honeycomb extrusion die which incorporates apertures for the conveyance of extrudable material through the die body toward a discharge opening in the face of the die, the aperture sidewalls are shaped by electrochemical machining or the like to develop a periodically varying aperture size, surface shape or surface finish, superimposed on the conventional randomly varying machined aperture sidewall surface, in order to reduce the adverse effects of random surface variations on extrusion process stability and extruded product quality.

7 Claims, 2 Drawing Sheets

METHOD FOR MACHINING EXTRUSION DIES

This application claims the benefit of U.S. Provisional application Ser. No. 60/037,396, filed Feb. 6, 1997, entitled METHOD FOR MACHINING EXTRUSION DIES, by Thomas W. Brew and W. Neil Peters.

BACKGROUND OF THE INVENTION

The present invention relates to methods for machining steel blank materials to form steel extrusion dies, and more particularly to a modified chemical drilling process which improves the performance of such extrusion dies for the extrusion of plasticized inorganic powder batch materials.

The manufacture of inorganic honeycomb structures from plasticized powder batches comprising inorganic powders dispersed in appropriate binders is well known. U.S. Pat. Nos. 3,790,654, 3,885,977, and 3,905,743 describe dies, processes and compositions for such manufacture, while U.S. Pat. Nos. 4,992,233 and 5,011,529 describe honeycombs of similar cellular structure extruded from batches incorporating metal powders.

The manufacture of extrusion dies for the production of ceramic honeycombs by these methods requires extremely precise machining. To supply material to the slotted honeycomb discharge section of such a die, the inlet or batch supply face of the die is provided with multiple apertures or feedholes through which the plasticized material to be extruded is forced under high pressure. For softer steels, the feedhole array can be formed by mechanical drilling, but if the die is to be formed of harder materials such as stainless steels, electrochemical machining techniques offer better results.

In the electrochemical machining (ECM) process, also referred to as the STEM (Shaped Tube Electrolyte Machining) process, the apertures are formed through a controlled deplating (dissolution) of the electrically conductive steel workpiece. An electrolytic cell is formed wherein the drill comprises the negatively charged electrode (cathode), the workpiece comprises the positively charged electrode (anode), and the electrolyte is a flowing electrically conductive fluid.

In the manufacture of extrusion dies the drill (cathode) suitably comprises a metal tube of titanium having an insulated outer surface extending toward an exposed tip. This inhibits electrolytic action everywhere except at the tip of the tube. The workpiece is typically a high grade stainless steel plate or block, and the electrically conductive electrolyte fluid is nitric acid.

To drive the electrolytic dissolution of steel proximate to the tip of the shaped tube to form an aperture, an electric potential is applied between the tube and the anodic workpiece. As drilling proceeds, the electrolyte is continuously pumped through the drilling tube and into contact with the steel workpiece, thereby completing the electrolytic cell while flushing dissolved steel away from the workpiece surface.

In this "forward cycle" phase of the drilling process, the electric potential is typically controlled to a constant voltage or, more preferably, to a constant current, and the drilling rate or tube feedrate is controlled to a constant value. The purpose of these controls is to maintain as much as possible a constant aperture and an optimally smooth aperture surface finish. U.S. Pat. No. 4,687,563 to Hayes, U.S. Pat. Nos. 5,320,721 and 5,322,599 to Peters, U.S. Pat. No. 5,507,925 to Brew, and published EP Application No. EP 0 245 545 describe the ECM process as it has been applied to the fabrication of steel extrusion dies, and variations on those processes.

Although ECM remains the process of choice for forming large arrays of fine apertures in tools such as extrusion dies, problems with this process still remain. One difficulty relates to small variations in aperture surface finish, presently attributed to random variations in processing factors such as electrolyte temperature, workpiece metallurgy, electrical contact, and a myriad of other process variables or their interactions.

In the case of honeycomb extrusion dies, one effect of such variations is that surface finish can vary from aperture to aperture across the aperture array forming the inlet to the die. This can result in an uneven flow front in the material being extruded from the outlet or discharge face of the die, a condition which can produce a variety of honeycomb product defects, including but not limited to significant variations in cell dimensions, cell shapes, and cell wall thicknesses in the honeycomb structures being extruded.

In fact, feed-hole finish appears to be a fundamental factor influencing the flow characteristics of honeycomb extrusion dies which is not yet within the ability of the art to completely control. This inability to control surface finish means that the extrusion process may not be operating in a processing regime that is optimal for high quality honeycomb production. If better surface finish control were possible, engineered surface finishes providing significant improvements in extruded product quality might be attainable.

SUMMARY OF THE INVENTION

The present invention achieves improved control over aperture surface finish in a drilled workpiece, such as an extrusion die preform, by applying a "masking" or overlying surface finish pattern to the walls of the feedholes in the die. That is, the method superimposes a programmed surface pattern on the randomly varying machined surface produced by conventional ECM drilling. The aim is to provide a periodically varying or cyclical surface finish profile on the aperture walls to reduce the adverse effects of random surface variations on, for example, extrusion process stability and extruded product quality.

The development of the programmed surface finish profile on the walls of each of the apertures is achieved by introducing a regularly varying or pulsed current, voltage or feedrate into the ECM process. The current, voltage or feedrate may be pulsed as a function of time or of drilling depth, typically being varied regularly between two preset limiting values. These limiting values determine the geometrical limits of the surface finish profile variation impressed on the aperture walls by the pulses.

In a first aspect, then, the invention resides in an improvement in the conventional ECM process for drilling an aperture array in an electrically conductive preform. In the conventional process, an electrical voltage is applied across a gap between a drilling tube and the preform through an electrolyte disposed in the gap. The application of the voltage generates an electrical current across the gap which removes material from the preform as the drilling tube is advanced at a controlled feedrate into the body of the preform.

In accordance with the improvement of the invention, the applied voltage, current, and/or feedrate are periodically and regularly varied as the drilling tube is advanced. This cyclical variation produces a cyclical variation in surface finish profile which masks random finish variations and provides an aperture with stable and reproducible flow characteristics.

As applied to the fabrication of honeycomb extrusion dies, the invention provides a method for forming an array of feed channels in a metal preform for an extrusion die which comprises applying an electrical voltage across a gap between the preform and a metal drilling tube while flowing an electrolyte through the gap between the tube and the die preform. The electrolyte provides the path for the conduction of electrical current between the preform and the tube, and flushes away metal dissolved from the preform by the current.

As the tube is advanced into the preform at a selected feedrate to form each feed channel, one or more of the voltage, current and/or feedrate are varied in a periodic pattern in order to periodically vary the rate or extent of metal removal from the walls of the feed channels. Voltage or current cycling produces a periodic variation in the rate of metal removal, while feedrate cycling produces a variation in the extent of metal removal; both provide a cyclical variation in the channel surface profile in each channel.

In yet another aspect the invention provides an improved process for making a honeycomb body from a plasticized inorganic powder batch material. In the typical extrusion forming process, the batch material is conveyed through an array of feed channel in an inlet portion of a honeycomb extrusion die and discharged from an outlet portion of the extrusion die in the shape of the desired honeycomb body. In accordance with the process of the invention, the stability of the extrusion process is enhanced by providing that the walls of the feed channels exhibit a cyclical variation in surface finish profile.

The use of feed channels with cyclically varying surface finish profiles provides not only improved stability against flowfront distortion in the short term, but also unexpected improvements in the long-term stability of the extrusion process resulting from wear effects on the die and associated forming hardware.

Finally the invention comprises a honeycomb extrusion die offering improved extrusion performance due to an improved batch flow characteristic. The extrusion die of the invention conventionally includes an inlet section and a discharge section, with the inlet section comprising a plurality of feed-hole apertures for receiving a flow of plasticized material and conveying it to the discharge section where it is shaped and extruded from the die as a honeycomb structure.

In accordance with the invention, these feed-hole apertures have a sidewall shape or finish such that, along at least a portion of their length, the feed-holes exhibit a flow resistance toward the plasticized material which varies cyclically with distance from the feed-hole inlet. In the preferred embodiments, the feed-holes exhibit a cyclical variation in at least one of sidewall surface finish, flow channel diameter, and/or flow direction along their length.

DESCRIPTION OF THE DRAWINGS

The invention may be further understood by reference to the drawings, wherein.

DETAILED DESCRIPTION

Figure 1:
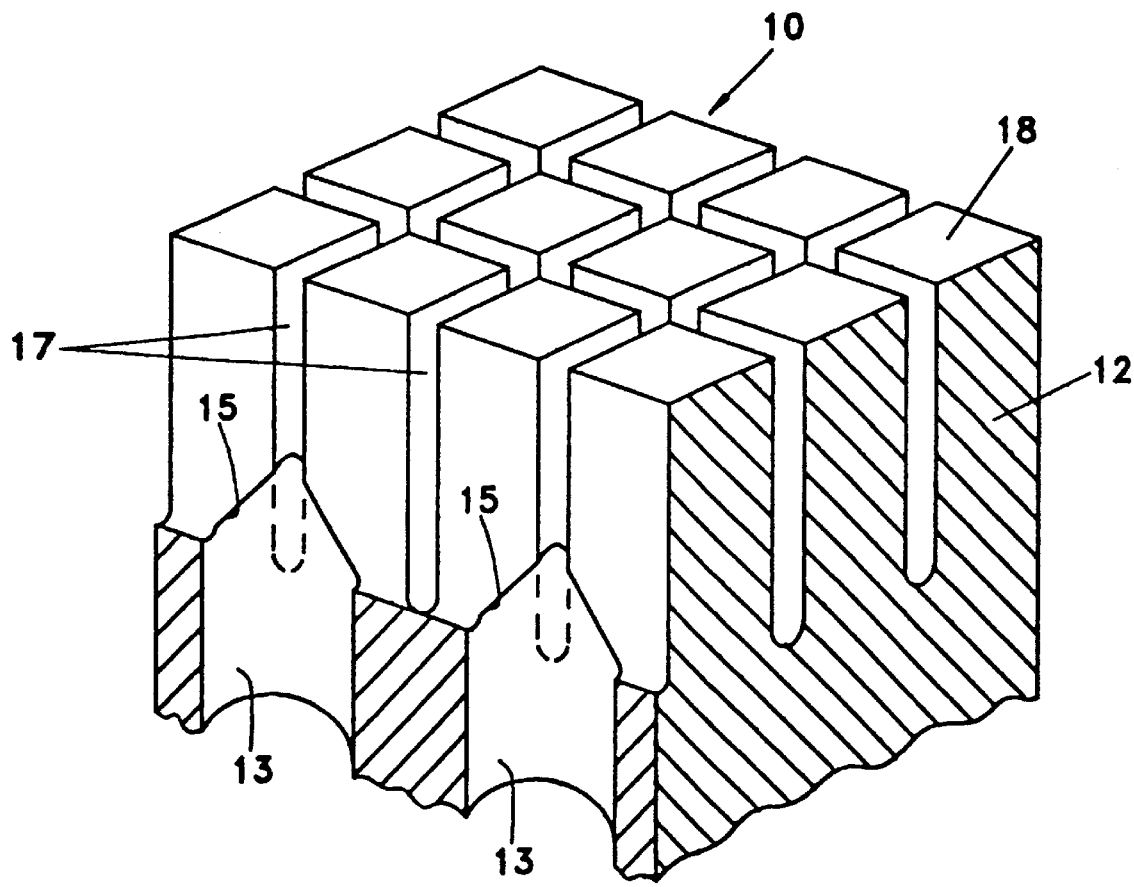
FIG. 1 is a schematic perspective view in partial cross-section of a section of a conventional honeycomb extrusion die.

A section of a honeycomb extrusion die of the kind employed in the art for the extrusion of ceramic honeycombs is schematically illustrated in partial cross-section in FIG. 1 of the drawings. As shown in that figure, extrusion die 10 comprises feed-holes 13 extending downwardly to a die inlet face (not shown) from which extrudable batch material is conveyed via feed-holes 13 to feed-hole terminations 15, and from there into discharge slots 17. Discharge slots 17, cut into feed-holes 13 to a depth indicated in cross-section 12 of FIG. 1, then discharge the batch material upwardly as a honeycomb shape from discharge face 18 of the die. Typically, feed-holes 13 are formed in the steel blank for the extrusion die by means of gun-drilling or ECM processing.

In the conventional ECM process for forming an aperture array in the extrusion die blank, both drill feedrate and electrical current through the electrolyte are held as constant as possible. The aim of maintaining constant feedrate and current is to achieve the maximum possible smoothness in the sidewalls of the feedhole apertures, so that flow resistance toward A plasticized powder batch material flowing through the feed-holes will be at a minimum. In fact, it is conventional practice to optimize feed-hole smoothness by means of a finishing pass of the drilling apparatus through each of the feed-holes after the initial holes have been drilled.

Figure 2:
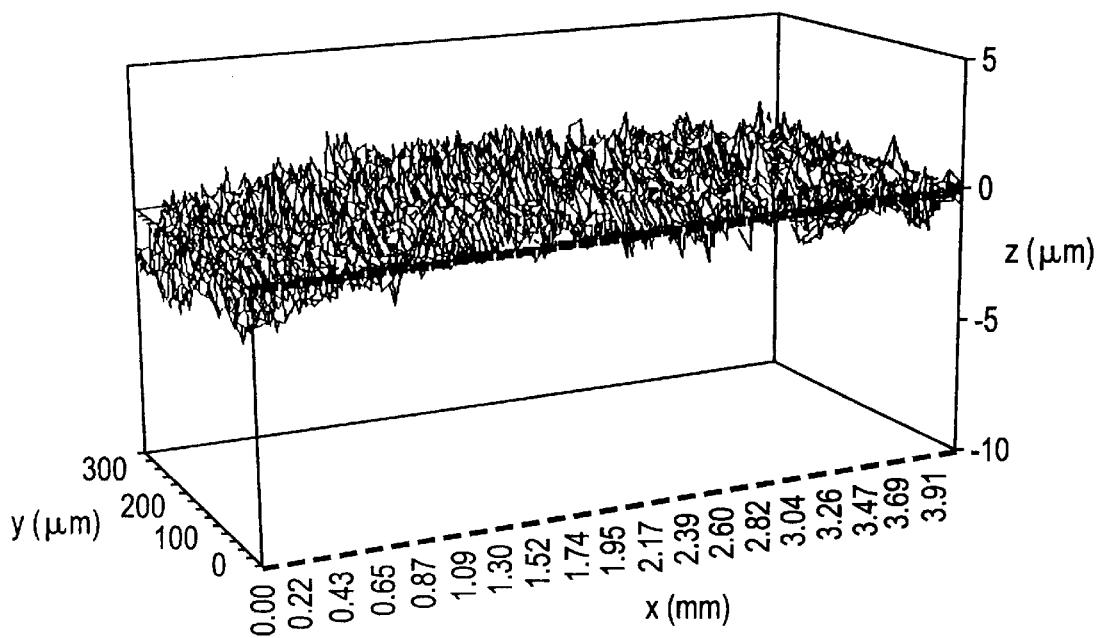
FIG. 2 is a surface roughness profile for an ECM aperture provided in accordance with prior art.

FIG. 2 of the drawing comprises a three-dimensional profilometer surface trace taken from the wall of a typical feed-hole channel formed by conventional ECM processing. The channel shown in FIG. 2 was formed by a drilling and polishing process conforming essentially to that described in U.S. Pat. No. 5,320,121, with the initial drilling step being carried out at an average current of about 165 amps and at a drill feedrate of 0.040 inches/minute.

The scale of the trace in FIG. 2 reflects profilometer coverage of a segment of the channel wall about 4 mm long and about 0.3 mm wide, the variation in the height of the surface traced being on the order of 10 microns. As is apparent from a study of this surface trace, small random surface irregularities remain in the walls of these feed-holes even with considerable attention paid to maintaining ECM current and drill feedrate constant. The overall feed-hole sidewall surface roughness (Ra) value for the surface shown in FIG. 2 is approximately 15 microinches.

In accordance with the present invention, significant improvements in extrusion process stability are achieved by introducing what may be characterized as a cyclical or periodically varying flow resistance into the feed-hole design. In a particular embodiment, the objective is achieved in an extrusion die wherein the feed-holes are provided with "wavy" sidewalls, i.e., the feed-holes are machined to introduce a small cyclical or periodic variation in channel diameter along at least a portion of the length of each feed-hole channel.

A specific example of a procedure for developing these so-called "turbulated" (turbulence-generating) feedholes is that of periodically varying or pulsing the electrical current and drill feedrate during the ECM drilling of the feed-holes in the die blank. A simple switching algorithm is used to vary pulse time, drill feedrate, and drill current as each feed-hole or group of feedholes is being drilled. The result is a feed-hole with a slightly increased surface roughness, but wherein the increase results primarily from a very small regular and periodic variation in feed-hole channel diameter.

In a particularly preferred pulsed ECM procedure, the ECM drilling process comprises alternately switching between a first set of drilling conditions and a second set of drilling conditions. The first set comprises drilling at a drill current of 162 amperes (maintainable at voltages of approximately 9 volts) and a drill feed rate of 0.042 inches/minute, these conditions being maintained for 20 seconds. The second set of conditions involves drilling at a drill current of 200 amperes (maintainable at voltages of approximately 13 volts) and a drill feed rate of 0.020 inches/minute for a drilling interval of 12.5 seconds.

In a specific example applying this procedure to the formation of a feed-hole array in a typical extrusion die blank, a feed-hole approximately 1.035 inches in depth and 0.062 inches in diameter is formed in a Type 422 P/M stainless steel die blank by ECM drilling. Throughout this drilling procedure, the drilling conditions are switched back and forth between the two sets of drilling conditions described above, in order to develop a periodic variation the extent of material removal from the sidewalls of the feed-hole as it is formed.

At the conclusion of the drilling process, the feed-hole is subjected to profilometer analysis using the same apparatus and procedure used to generate the data shown in FIG. 2. The resulting profilometer trace, covering a section of the feed-hole sidewall about 4 mm in length and 0.15 mm in width, is presented in FIG. 3 of the drawing.

Figure 3:
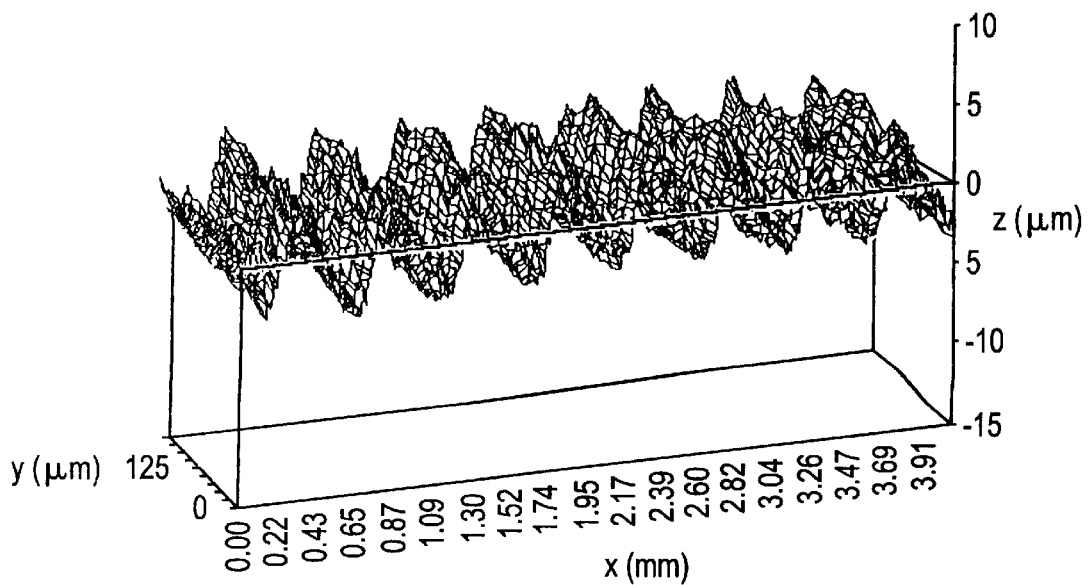
FIG. 3 is a surface roughness profile for an ECM aperture provided in accordance with the invention.

As evident from an examination of FIG. 3, the profilometer trace presented does not show any significant decrease in the surface irregularities resulting from the uncontrolled variations in the ECM process manifested in FIG. 1. However, superimposed on these irregularities is a periodic, quasi-sinusoidal variation in surface height, covering a range of about −4 to +4 micrometers, directly resulting from the pulsed ECM drilling procedure. This small-scale periodic variation, corresponding to a slight periodic variation in feed-hole diameter, in fact effects an increase in the average roughness (Ra) value for the feed-hole, in this case to values between 80 and 100 microinches.

Somewhat unexpectedly, honeycomb extrusion dies incorporating feed-holes with periodically varying surface profiles as shown in FIG. 3 demonstrate significantly improved extrusion performance notwithstanding the somewhat higher profilometer roughness of the feed-holes. Particular process improvements include more uniform extrusion flowfronts and less bending or "bowing" of the extruded honeycomb shapes. These benefits are clearly attributable to the very consistent hole to hole surface finish effect machined into the feed-holes, which overshadows the smoother but more random surface finish produced by conventional ECM drilling processes.

Yet another advantage of the honeycomb extrusion dies of the invention relates to the long term stabilizing effect of the new feed-hole design on the extrusion process. Die wear during the extrusion of plasticized ceramic powder materials can be significant. These changes affect die forming behavior, requiring frequent changes in associated honeycomb forming hardware, such as the masks used to form smooth skin surfaces on the honeycomb cores, in order that use of the particular die can be continued.

Extrusion dies incorporating the "turbulated" feedhole profiles produced by pulsed ECM drilling as above described also tend to show much smaller wear-related changes in extrusion performance. In some cases, extrusion performance sufficiently stable to permit a 20-fold increase in the amount of material extruded from a single die without change of any associated honeycomb forming hardware is achieved. This improved stability significantly reduces production costs attributable to wasted batch material and production line down-time.

The present invention is not limited to relatively simple short or long term feed-hole sidewall profile variations such as those produced by the current and feedrate pulsing described above. Instead, that pulsing could be replaced by more complex functions of forward cycle voltage, current or feedrate. For example, more complex current pulsing could be employed to introduce a combination of short and long term sidewall profile fluctuations, or the drilling conditions could be otherwise varied to "program in" a more complex feed-hole surface finish or height profile to best suit the needs of a particular extrusion process or extrudable material.

A particular example of a pulsed ECM drilling process of this type is a pulsed current I(t) of the periodic form:

$$I(t) = I_1 \sin(w_1 * t) + I_s \sin(w_s * t + r)$$

wherein:

I(t)=net drilling current
$I_1$=peak long term current
$I_s$=peak short term current
$w_1$=frequency of long term current cycle
$w_s$=frequency of short term current cycle
r=phase angle, if desired Similarly, the invention is not limited to variations in flow resistance provided by fluctuating feed-hole sidewall profiles only. Alternative approaches could include periodic variations in feedhole surface finish, or even periodic changes in feed-hole channel shape or direction. These and numerous other variations upon the methods and apparatus hereinabove described may be resorted to by those skilled in the art within the scope of the appended claims.

We claim:

1. In the method for forming an inlet feed-hole in a preform for a honeycomb extrusion die wherein an electrical current from a voltage applied across a gap between a drilling tube and the preform passes through an electrolyte disposed in the gap to remove material from the preform as the drilling tube is advanced at a selected feedrate therethrough, the improvement wherein:

the applied voltage, current, and/or feedrate are periodically and regularly varied as the drilling tube is advanced; and the cyclical variation in diameter has a frequency in the range of 0.5–5/mm and an amplitude in the range of 1–10 micrometers.

2. A method for forming a honeycomb body from a plasticized inorganic powder batch material which comprises:

conveying the batch material into an array of feed channels in an inlet portion of a honeycomb extrusion die, the walls of the feed channels exhibiting a cyclical variation in at least one of surface finish or surface profile having a period in the range of about 0.2–2 mm along at least a portion of their length, and discharging the material from interconnecting outlets in a discharge portion of the extrusion die in the shape of a honeycomb.

3. A method in accordance with claim 2 wherein the walls of the feed channels exhibit a cyclical variation in surface profile.

4. A method in accordance with claim 3 wherein the cyclical variation in surface profile arises from a cyclical variation in feed channel diameter.

5. A method in accordance with claim 4 wherein the cyclical variation in channel diameter has an amplitude in the range of 1–10 micrometers.

6. A honeycomb extrusion die having an inlet portion and a discharge portion, the inlet portion incorporating an array of feed-hole apertures for receiving a plasticized material and conveying it to the discharge portion for shaping and extrusion as a honeycomb body, wherein the feed-hole apertures comprise sidewall surfaces exhibiting a cyclical variation in sidewall surface finish, aperture shape, aperture diameter, and/or aperture flow direction having a period of about 0.2–2 mm along at least a portion of their length.

7. A honeycomb extrusion die in accordance with claim 6 wherein the feed-hole apertures are configured to provide a cyclical variation in diameter having an amplitude in the range of 1–10 micrometers.

* * * * *